(12) United States Patent
Banerjee et al.

(10) Patent No.: US 7,843,916 B2
(45) Date of Patent: * Nov. 30, 2010

(54) IMPLEMENTING READ-ONLY ZONES IN A SWITCHING FABRIC

(75) Inventors: Subrata Banerjee, Los Altos, CA (US); Badri Ramaswamy, Saratoga, CA (US); Dinesh G. Dutt, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 381 days.

This patent is subject to a terminal disclaimer.

(21) Appl. No.: 11/844,910

(22) Filed: Aug. 24, 2007

(65) Prior Publication Data

US 2007/0286191 A1 Dec. 13, 2007

Related U.S. Application Data

(63) Continuation of application No. 10/637,732, filed on Aug. 7, 2003, now Pat. No. 7,277,433.

(51) Int. Cl.
*H04L 12/28* (2006.01)
(52) U.S. Cl. .................. 370/389; 370/392; 370/360; 711/163
(58) Field of Classification Search ............. 711/163
See application file for complete search history.

(56) References Cited

U.S. PATENT DOCUMENTS

| | | | |
|---|---|---|---|
| 4,734,884 | A | 3/1988 | Kohno et al. |
| 6,330,648 | B1 | 12/2001 | Wambach et al. |
| 6,516,999 | B1 | 2/2003 | Belonoznik |
| 7,571,261 | B2 * | 8/2009 | Kaushik et al. ............. 710/5 |
| 2002/0176417 | A1 * | 11/2002 | Wu et al. ............. 370/389 |
| 2002/0176433 | A1 | 11/2002 | Zhu et al. |
| 2002/0176434 | A1 | 11/2002 | Yu et al. |
| 2004/0085908 | A1 * | 5/2004 | Balasubramanian et al. 370/252 |
| 2004/0218593 | A1 | 11/2004 | Hammons et al. |

OTHER PUBLICATIONS

Office Action dated Jan. 11, 2008 regarding Application 04 777 462.5-2416 received from an European Patent Office.
International Search Report from related PCT application PCT/US2004/021339, mailed Jan. 4, 2005.
Written Opinion from related PCT application PCT/US2004/021339, mailed Jan. 4, 2005.

(Continued)

*Primary Examiner*—Duc C Ho
(74) *Attorney, Agent, or Firm*—Weaver Austin Villeneuve and Sampson LLP

(57) ABSTRACT

The Switch includes a port configured to receive a command frame when installed in a switching Fabric. The frame identifies a source device and a destination device in the Switching Fabric, a command, and a read/write flag which indicates if the identified source intends to exercise read-only or write access to the destination device. The Switch also includes a processor coupled to the port. The processor is configured to trap the frame and prevent it from reaching the defined destination device in the switching Fabric if both the source and destination devices are in a read-only zone and the flag indicates that the source intends to write to the destination device. In this manner, read-only zones can be implemented in the Switching Fabric.

24 Claims, 4 Drawing Sheets

OTHER PUBLICATIONS

Chinese First Office Action mailed Jan. 16, 2009, from Application No. 200480020882.2.

Chinese Second Office Action mailed Dec. 18, 2009, from Application No. 200480020882.2.

Notice of Allowance dated Jun. 28, 2007, U.S. Appl. No. 10/637,732.

Chinese Second Office Action mailed Apr. 13, 2010, Application No. 200480020882.2.

* cited by examiner

IMPLEMENTING READ-ONLY ZONES IN A SWITCHING FABRIC

CROSS REFERENCE TO RELATED APPLICATIONS

This application is a continuation of pending U.S. application Ser. No. 10/637,732, filed Aug. 7, 2003, from which priority under 35 USC §120 is claimed, and which is incorporated herein by reference in its entirety for all purposes.

BACKGROUND OF THE INVENTION

1. Field of the Invention

The present invention relates to storage area networks, and more particularly, to implementing read-only zones in Fibre Channel Fabrics.

2. Background of the Invention

With the increasing popularity of Internet commerce and network centric computing, businesses and other organizations are becoming more and more reliant on information. To handle all of this data, storage area networks or SANs have become very popular. A SAN typically includes a number of storage devices, a plurality of Hosts, and a number of Switches arranged in a Switching Fabric that connects the storage devices and the Hosts.

Most SANs rely on the Fibre Channel protocol for communication within the Fabric. For a detailed explanation of the Fibre Channel protocol and Fibre Channel Switching Fabrics and Services, see the Fibre Channel Framing and Signaling Standard, Rev 1.70, American National Standard of Accredited Standards Committee (NCITS), Feb. 8, 2002, and the Fibre Channel Switch Fabric—2, Rev. 5.4, NCITS, Jun. 26, 2001, and the Fibre Channel Generic Services—3, Rev. 7.01, NCITS, Nov. 28, 2000, all incorporated by reference herein for all purposes.

Fibre Channel based SANs are often organized into zones. Within each zone, Hosts can see and access only storage devices or other hosts belonging to that zone. This allows the coexistence on the same SAN of different computing environments. For example, it is possible to define on a SAN a Unix zone and a separate Windows zone. Unix servers in the Unix zone may access only storage or hosts devices within the Unix zone, and do not interfere with the other devices connected to the SAN. In the same manner, Windows servers belonging to the Windows zone may access storage or host devices only within the Windows zone, without interfering with the other devices connected to the SAN. The SAN administrator may define in a SAN multiple zones, as required or dictated by the computing and storage resources connected to it. The Switching Fabric allows communications only between devices belonging to the same zone, preventing a device of one zone from seeing or accessing a device of another zone. A host for example can access a storage device in another zone only if that storage device happens to also be in the same zone as the host.

Generally, all the host(s) in a zone have both read and write access to the storage devices in their zone. In certain situations, such as data-mining application, centralized database search operations, etc., it would be desirable to designate one or more zones in a SAN as read-only zones. In other words, each of the hosts in a read-only zone can read, but cannot write to, the storage devices in that zone. Read-only zones would be advantageous because the same storage medium can be accessed by multiple hosts while only a selected hosts can modify the storage. In the absence of read-only zones, a separate copy of the storage contents has to be created.

SUMMARY OF THE INVENTION

To achieve the foregoing, and in accordance with the purpose of the present invention, a Switch for implementing read-only zones in a Switching Fabric is disclosed. The Switch includes a port configured to receive a command frame when installed in a switching Fabric. The frame identifies a source device and a destination device in the Switching Fabric, a command, and a read/write flag which indicates if the identified source intends to exercise read-only or write access to the destination device. The Switch also includes a processor coupled to the port. The processor is configured to trap the frame and prevent it from reaching the defined destination device in the switching Fabric if both the source and destination devices are in a read-only zone and the flag indicates that the source intends to write to the destination device. The processor is also configured to send a Write Protect message to the source device if the frame is trapped. In this manner, read-only zones can be implemented in the Switching Fabric.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 1:
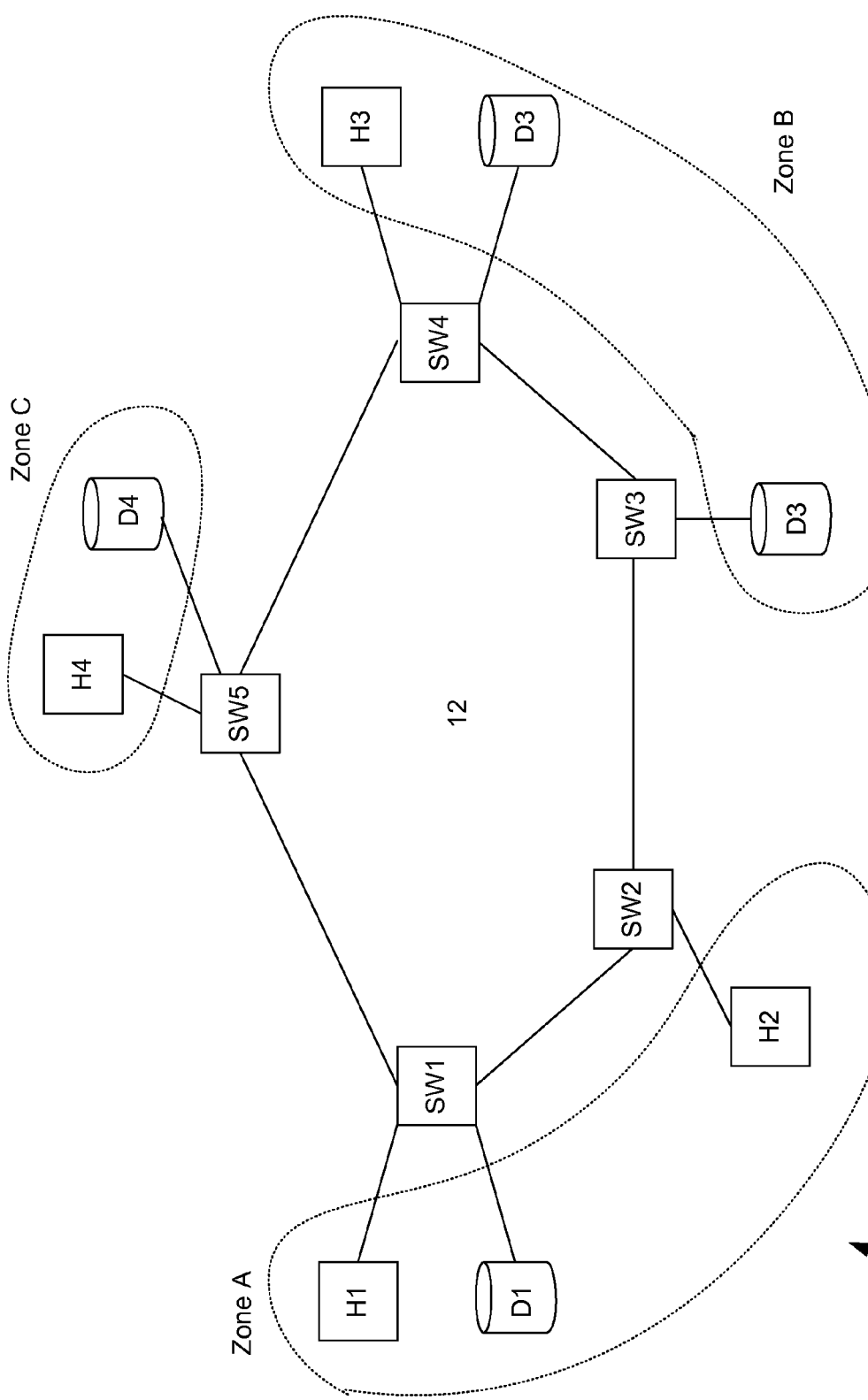
FIG. 1 is an exemplary Storage Area Network according to the present invention.

Referring to FIG. 1, an exemplary Storage Area network (SAN) according to the present invention is shown. The storage area network (SAN) 10 includes a Switching Fabric 12 that includes a plurality of Fibre Channel Switches SW1 through SW5. Also included in the SAN 10 are a plurality of hosts H1 through H4 and a plurality of storage devices D1 through D4. According to various embodiments of the invention, the hosts can be any type of host including but not limited to servers or personal computers running on the Unix, Windows or any other computing platform. Similarly, the storage devices D1-D4 can be any type of storage device including but not limited to tape back-up systems, emulated tape back-up systems, CD-ROM storage arrays, or one or more disks such as a Redundant Array of Independent Disks (RAID). The Switches SW1-SW5 can be any type of Fibre Channel Switch such as those commercially available from Cisco Systems of San Jose, Calif. or Andiamo Systems, the assignee of the present application.

As depicted in FIG. 1, the hosts H and storage devices D are arranged into three zones. The members of zone A include hosts H1 and H2 and storage disk D1. The members of zone B include host H3 and storage devices D2 and D3. The members of zone C include host H4 and storage device D4. The individual zones are typically defined on the basis of the operating systems used, and so they can be either Unix zones, Windows zones, or some other type of computing platform zone, but they can be defined also on the basis of other requirements. Although not depicted, zones can also overlap with one another. It should be noted that the number and types of hosts H, storage devices D, and Switches SW, and their particular arrangement in the zones A, B and C as shown is merely illustrative. In no way should this example be construed as limiting the invention.

Figure 2:
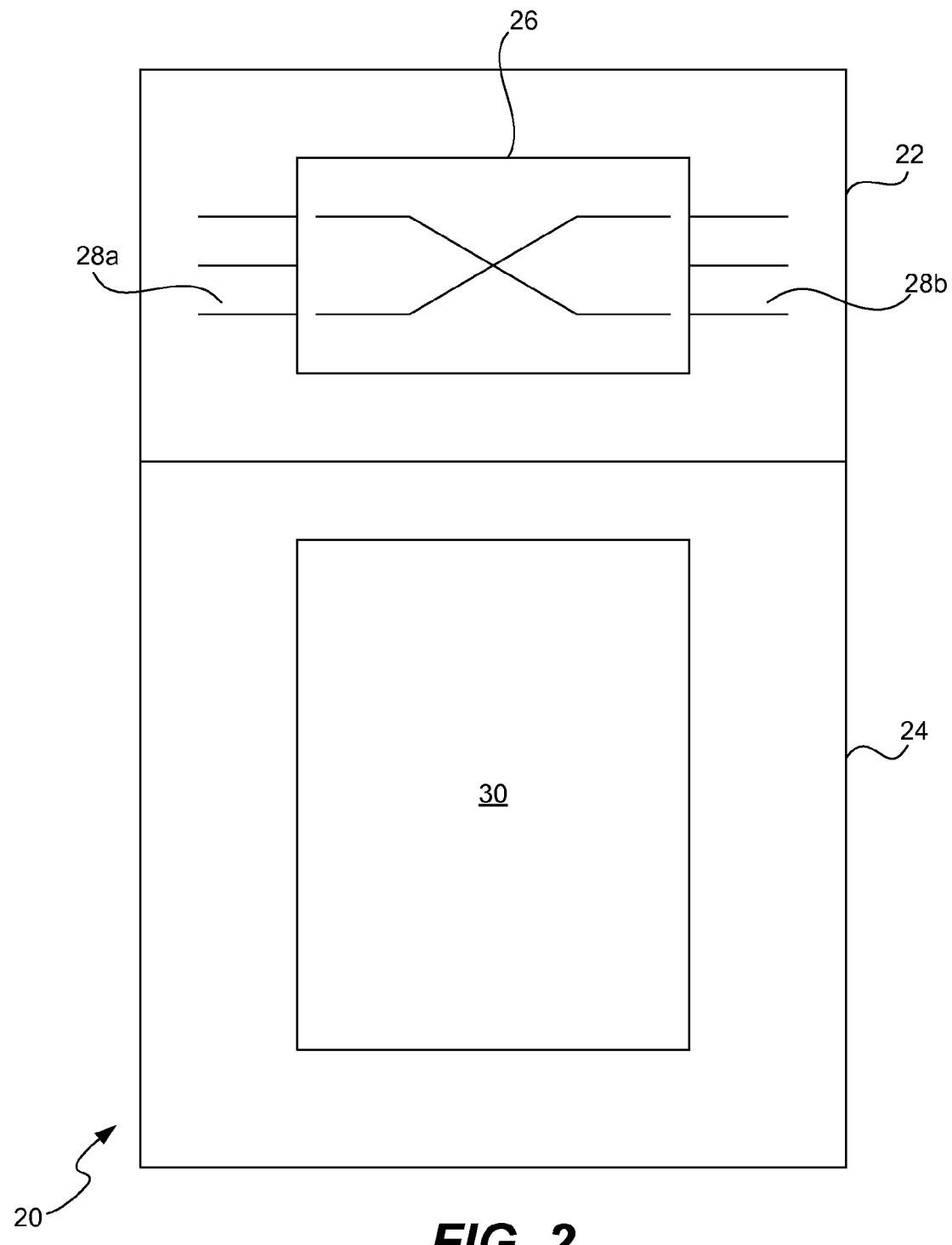
FIG. 2 is a block diagram of a Switch according to the present invention.

Referring to FIG. 2, a block diagram of the Switches SW1-SW5 is shown. The Switch 20 includes a data plane 22 and a control plane 24. In the data plane 22, the Switch includes switching logic 26 connected between two sets of ports 28a and 28b. The switching logic 26 is configured to route or internally switch traffic received on one port 28a to another port 28b and vice versa. The control plane 24 includes a generic or application-specific processor 30 for implementing all the switching Fibre Channel functionality and protocols such as those specified in the aforementioned NCITS documents, incorporated by reference herein. In various embodiments of the invention, the processor 30 may be implemented in a state machine, a micro-controller, hardware, firmware, programmable logic, or a combination thereof.

Figure 3:
FIG. 3 is a Fibre Channel frame header according to the present invention.

Referring FIG. 3, a simplified Fibre Channel frame header according to the present invention is shown. The simplified frame header 40 includes a source identifier field 42, a destination identifier field 44, a WRDATA field 46, and a command field 48 for including the command defined by the frame. The source identifier field 42 and destination identifier field 44 identify the source and destination of the frame. It should be noted that the header 40 illustrated in the FIG. 3 is a simplified frame used for illustrating the present invention. An actual frame would include all of the fields used with a standard Fibre Channel frame as described in the aforementioned NCITS documents.

The Fibre Channel standard requires that WRDATA field 46 be set in any and all Fibre Channel commands which have data frames associated with the command frame which are traveling in the same direction as the command frame. Accordingly, if a command frame is sent from a first end device H1 (either a host or storage device) to a second end device H2 (again, either a host or storage device) and there are associated data frames being sent from end devices H1 to H2, then the WRDATA field 46 is set by the sending entity, in this case the end device H1. On the other hand, with a read command from end device H1 to end device H2, there are no associated data frames in the H1 to H2 direction. Consequently, the end device H1 will reset the WRDATA field 46. The WRDATA flag is present only in the command frame. The flag is not present in the response frame.

Thus with all command frames that will alter or modify the data on an end device, the WRDATA field 46 is set (equal to 1). With command frames that will not modify or alter the data on an end device, it is cleared or reset (equal to 0). For example, a Format command is usually associated with data that specifies a defect list (i.e., a list of blocks to be hidden from the user after formatting) or initialization pattern (i.e., a pattern to write onto a disk during formatting). Consequently, the WRDATA field 46 is typically set for Format commands and other SCSI commands (e.g., WRITE) that will modify or alter the data on a storage device. It should be noted that the "WRDATA" label used herein is arbitrary and should not be construed as limiting the invention. The field 46 is in essence a read/write flag regardless of the label it is given.

According to the present invention, "read-only" zones are configured by setting an access attribute of a Fibre Channel zone thereby providing the host(s) within that zone with read-only access to other members of that zone. In zone A of FIG. 1 for example, the hosts H1 and H2 would ordinarily have read and write access to the storage device D1 by default. However, if zone A is to be made a read-only zone, then hosts H1 and H2 are given read-only access to the storage device D1. The access attribute of a zone is configured by a SAN administrator and is enforced by the Switches in the Fabric based on this configuration.

Figure 4:
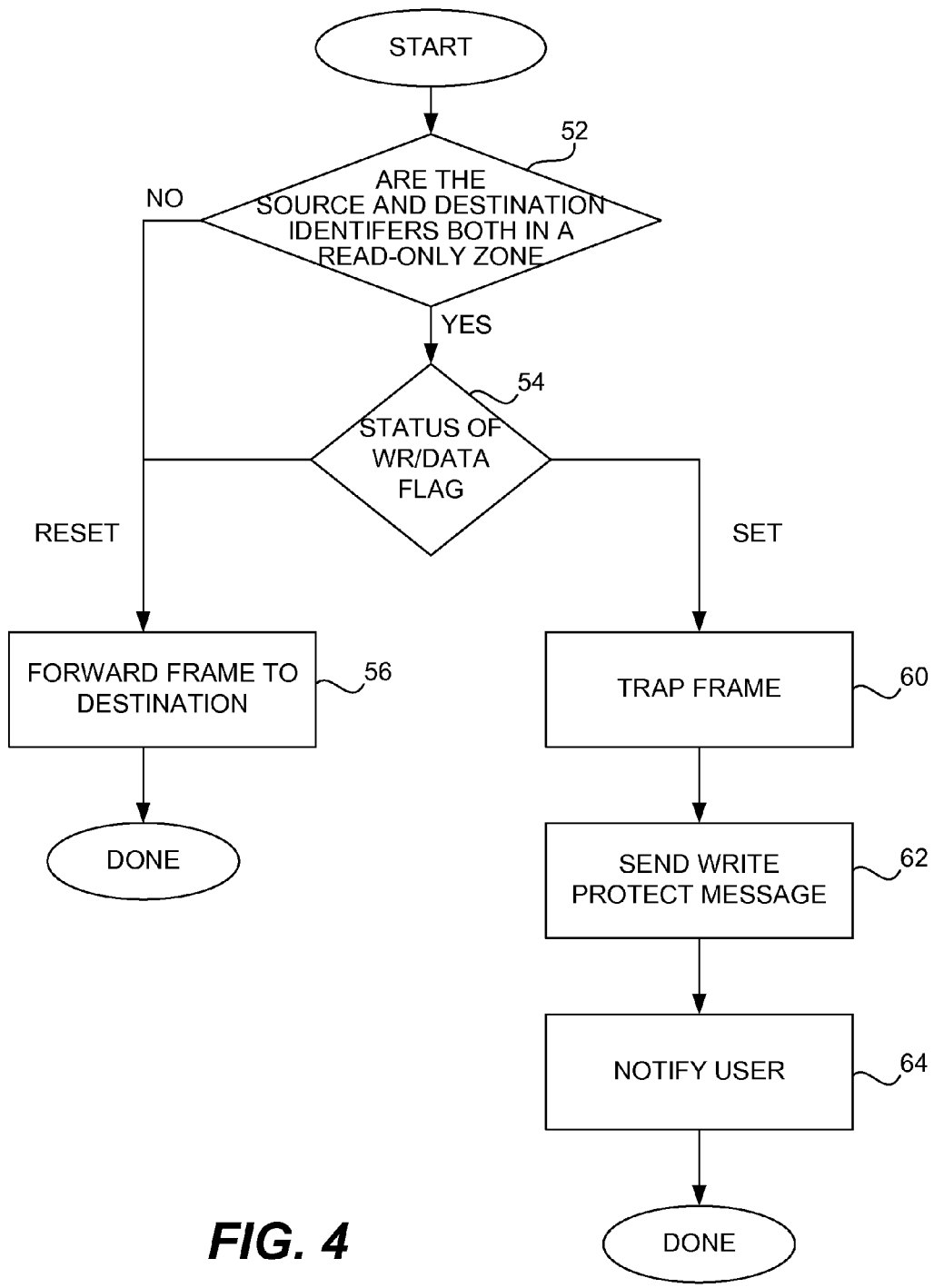
FIG. 4 is a flow chart illustrating the method of the present invention according to one embodiment.

FIG. 4 is a flow chart 50 illustrating the enforcement of read-only zones within the switching Fabric 12. When a frame is injected into the Fabric 12 by a source end device in a read-only zone to a destination device (either a storage device or another host) within the same read-only zone, it is received at one of the Switches (box 52). In decision diamond 52, the Switch determines if both the identified source and destination end devices in the frame are within the same read-only zone. If no, the frame is forwarded along the best path to its destination (box 56). (If neither the source and destination end devices are in a read-only zone or a read-write zone, then the frame is dropped). If yes, in decision diamond 54, the control processor 30 of the Switch checks the status of the WRDATA flag in field 46. If the flag is reset to read, then the frame is forwarded along the best path to the specified destination (box 56). On the other hand, if the flag is set to write, then the frame or command is trapped (box 60) by the processor 30. The Switch then generates a standard Fibre Channel "Write Protect" response message to the source end device (box 62) that generated the frame. When the Write Protect message is received by the source end device, the user is notified that the frame or command was not accepted by the destination device (box 64). The origin of the Write-Protect message is transparent. The source device is unaware that the Write-Protect message was actually from the Switch and not from the destination device. This feature is preferable over simply dropping the frame because it prevents the source device from becoming "hung up" waiting for a response from the destination device, which of course, will never arrive in situations where a trap occurred.

The embodiments of the present invention described above are to be considered as illustrative and not restrictive. A SAN can be configured to have both read-only zones and standard read and write zones. In addition, hosts and storage device members of a read-only zone can also be included in multiple zones having read-only and/or read and write access. The description of the invention provided above predominately covers access between hosts and storage devices. The present invention, however, can equally apply between any two Fibre Channel devices, such as access between two hosts. The invention is not to be limited to the details given herein, but may be modified within the scope and equivalents of the appended claims.

What is claimed is:

1. A method comprising:
   providing a Switch for use in a Switching Fabric, the provided Switch including a port configured to receive a command frame over the Switching Fabric, the frame identifying:
   a source device in the switching Fabric;
   a destination device in the Switching Fabric;
   a command; and
   a read/write flag which indicates if the source device intends to exercise write access to the destination device; and
   the provided Switch further including a processor, coupled to the port, the processor configured to:
   ascertain the status of the read/write flag in the frame;

trap the frame and prevent it from reaching the identified destination storage device in the switching Fabric if the source and the destination devices identified in the frame belong to a read-only zone and the status of the flag is set to write; and send a Write Protect message to the source device if the frame is trapped, wherein the trapping the frame and sending the Write Protect message to the source device are performed at least in part to implement the read-only zone by preventing the source device from becoming stalled waiting for a response from the destination device.

2. The method of claim 1, wherein the processor of the provided Switch is further configured to forward the frame to the destination device if the status of the flag indicates read or the source device and/or the destination device identified in the frame belong to a read-write zone.

3. The method of claim 1, wherein the command is dropped if neither the source and destination end devices are in a read-only zone or a read-write zone.

4. The method of claim 1, wherein the read/write flag, which indicates if the source device intends to exercise write access to the destination device, is set if the command frame has associated data frames being sent from the source device to the destination device.

5. The method of claim 1, wherein the read/write flag, which indicates if the source device intends to exercise write access to the destination device, is reset if the command frame has no associated data frames being sent from the source device to the destination device.

6. A method of providing a Switching Fabric, the method comprising:

providing a read-only zone in the Switching Fabric, the provided read-only zone including:
at least one source device; and
at least one destination device;

providing a Switch coupled between the at least one source device and destination device, the provided Switch being configured to trap commands from the at least one source device to the destination device when the commands from the at least one source device to the at least one destination device will modify data stored on the at least one destination device, wherein the provided Switch is further configured to generate a Write Protect message to the at least one source device when a command is trapped, and wherein the trapping the commands and sending the Write Protect message to the at least one source device are performed at least in part to implement the read-only zone by preventing the source device from becoming stalled waiting for a response from the destination device.

7. The method of claim 6, wherein the provided Switch is further configured to ascertain if the at least one source device to the at least one destination device are both in the read-only zone.

8. The method of claim 6, wherein the provided Switch is further configured to not trap commands between the at least one source device and the at least one destination device when the commands will not modify the data stored on the at least one destination device.

9. The method of claim 6, wherein the provided Switch is further configured to not trap commands that identify a destination device not in the read-only zone.

10. The method of claim 6, the provided Switching Fabric further comprising a second zone, the second zone being configured as a read and write zone.

11. The method of claim 10, wherein the provided at least one source device is included in both the read-only zone and the read and write zone.

12. The method of claim 10, wherein the provided at least one destination device is included in both the read-only zone and the read and write zone.

13. The method of claim 6, wherein the provided at least one source device is one of the following types of source devices: a host or a storage device.

14. The method of claim 6, wherein the provided at least one destination device is one of the following types of destination devices: a host or a storage device.

15. A method of operating a Switch in a Switching Fabric, the method comprising:

receiving a command frame over the Switching Fabric at a port of the Switch, the frame identifying:
a source device in the switching Fabric;
a destination device in the Switching Fabric;
a command; and
a read/write flag which indicates if the source device intends to exercise write access to the destination device; and processing the command frame received at the port of the Switch, the Switch processing the command frame by:
ascertaining the status of the read/write flag in the frame;
trapping the frame and preventing it from reaching the identified destination storage device in the switching Fabric if the source and the destination devices identified in the frame belong to a read-only zone and the status of the flag is set to write; and
sending a Write Protect message to the source device if the frame is trapped,
wherein the trapping the frame and sending the Write Protect message to the source device are performed at least in part to implement the read-only zone by preventing the source device from becoming stalled waiting for a response from the destination device.

16. The method of claim 15, wherein processing the command frame received at the port of the Switch further comprises forwarding the frame to the destination device if the status of the flag indicates read or the source device and/or the destination device identified in the frame belong to a read-write zone.

17. The method of claim 15, wherein processing the command frame received at the port of the Switch further comprises dropping the command if neither the source and destination end devices are in a read-only zone or a read-write zone.

18. The method of claim 15, wherein processing the command frame received at the port of the Switch further comprises setting the read/write flag, the read/write flag indicating if the source device intends to exercise write access to the destination device, if the command frame has associated data frames being sent from the source device to the destination device.

19. The method of claim 15, wherein processing the command frame received at the port of the Switch further comprises resetting the read/write flag, the read/write flag indicating if the source device intends to exercise write access to the destination device, if the command frame has no associated data frames being sent from the source device to the destination device.

20. A Switch, comprising:
port means configured to receive a command frame when installed in a switching Fabric, the frame identifying:
a source device in the switching Fabric;
a destination device in the Switching Fabric;

a command; and a read/write flag which indicates if the source device intends to exercise write access to the destination device; and processor means, coupled to the port, the processor means configured to:

ascertain the status of the read/write flag in the frame;

trap the frame and prevent it from reaching the identified destination storage device in the switching Fabric if the source and the destination devices identified in the frame belong to a read-only zone and the status of the flag is set to write; and send a Write Protect message to the source device if the frame is trapped, wherein the trapping the frame and sending the Write Protect message to the source device are performed at least in part to implement the read-only zone by preventing the source device from becoming stalled waiting for a response from the destination device.

21. The Switch of claim 20, wherein the processor means is further configured to forward the frame to the destination device if the status of the flag indicates read or the source device and/or the destination device identified in the frame belong to a read-write zone.

22. The Switch of claim 20, wherein the command is dropped if neither the source and destination end devices are in a read-only zone or a read-write zone.

23. The Switch of claim 20, wherein the read/write flag, which indicates if the source device intends to exercise write access to the destination device, is set if the command frame has associated data frames being sent from the source device to the destination device.

24. The Switch of claim 20, wherein the read/write flag, which indicates if the source device intends to exercise write access to the destination device, is reset if the command frame has no associated data frames being sent from the source device to the destination device.

\* \* \* \* \*